R. BAHMANN.
COFFEE PULPER.
APPLICATION FILED OCT. 10, 1906.

991,413.

Patented May 2, 1911.

3 SHEETS—SHEET 1.

Witnesses
Ada Burnett
Brayton G. Richards

Inventor
Richard Bahmann
By James A. Ramsey
Attorney

R. BAHMANN.
COFFEE PULPER.
APPLICATION FILED OCT. 10, 1906.

991,413.

Patented May 2, 1911.

3 SHEETS—SHEET 2.

Witnesses
Brayton J. Richards
Ada Burnett

Inventor
Richard Bahmann
By James N. Ramsey
Attorney

R. BAHMANN.
COFFEE PULPER.
APPLICATION FILED OCT. 10, 1906.

991,413.

Patented May 2, 1911.
3 SHEETS—SHEET 3.

Witnesses
Brayton G. Richards
Ada Burnett

Inventor
Richard Bahmann
By James A. Ramsey
Attorney

UNITED STATES PATENT OFFICE.

RICHARD BAHMANN, OF CINCINNATI, OHIO, ASSIGNOR TO THE BLYMYER IRON WORKS COMPANY, OF CINCINNATI, OHIO, A CORPORATION OF OHIO.

COFFEE-PULPER.

991,413.      Specification of Letters Patent.      Patented May 2, 1911.

Application filed October 10, 1906. Serial No. 338,205.

*To all whom it may concern:*

Be it known that I, RICHARD BAHMANN, a citizen of the United States, residing at College Hill, a suburb of the city of Cincinnati, in the county of Hamilton and State of Ohio, have invented certain new and useful Improvements in Coffee-Pulpers, of which the following is a specification.

My invention relates to improvements in means for removing and separating the pulp from coffee berries.

The object of my invention is to produce a machine with the pulping mechanism entirely inclosed or incased, one of the principal reasons of which is to prevent the water from splashing, spattering, dripping, or otherwise escaping from the machine and whereby the water will discharge only through the discharge outlets and where the entire concave surface of the pulping chamber and entire convex surface of the pulping cylinder simultaneously operate upon the coffee to pulp it, thus rendering a comparatively larger capacity for removing and separating the pulp from the coffee berries or beans in an effective, cleanly, and economical manner and to render it more economical in the use of water.

My invention consists in a coffee pulper having a chamber provided with an abrading surface, a cylinder mounted and adapted to rotate within said chamber and having an abrading surface comprising a series of ribs on the surface of the cylinder forming alternate coffee and pulp channels, means to feed the coffee and regulate its passage through the channels, means for removing the pulp from the coffee beans and means for separating and discharging the coffee beans and pulp respectively, all as described and claimed.

My invention also consists in the parts and in the combination and arrangement of parts as herein set forth and claimed.

Figure 2:
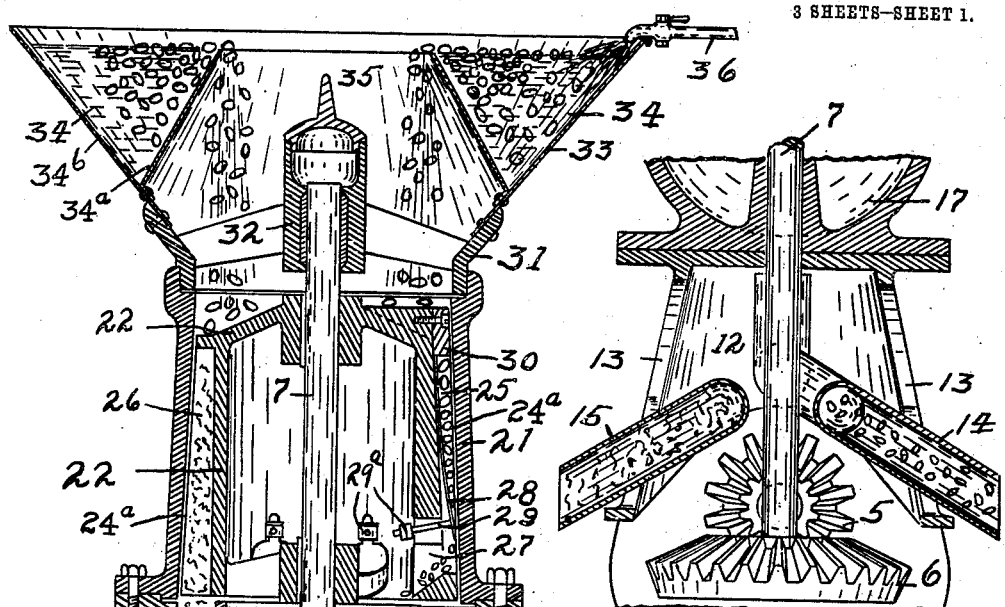
Figure 1:
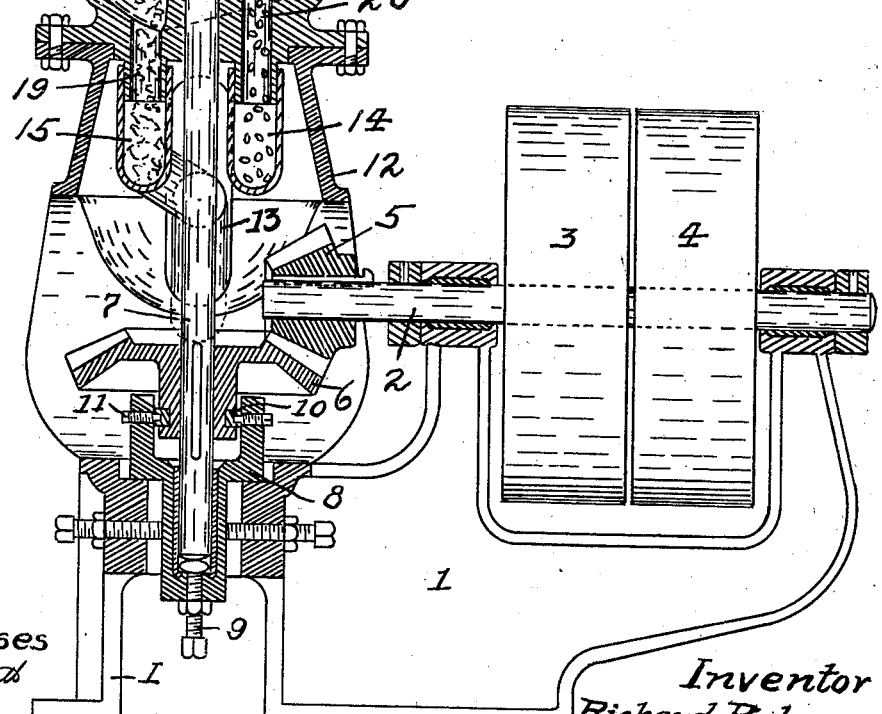
Figure 3:
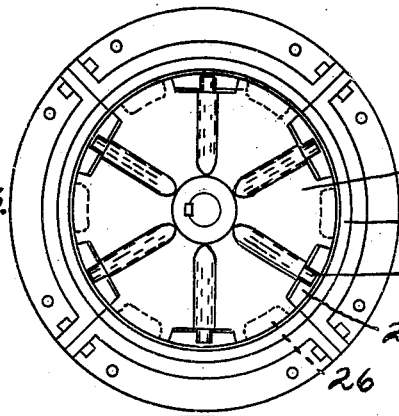
Figure 6:
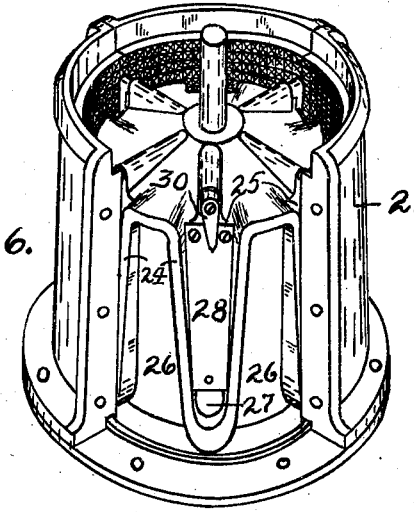
Figure 7:
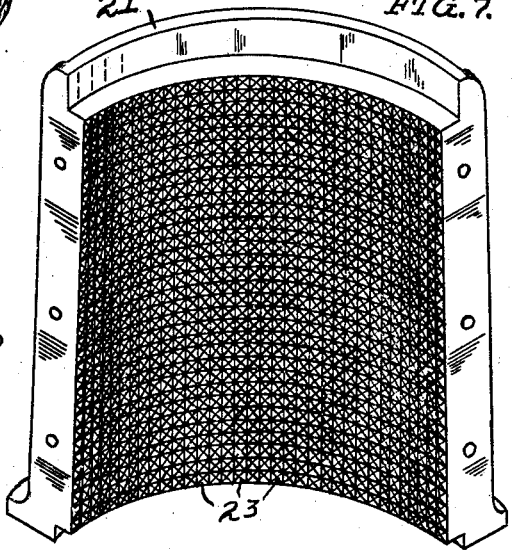
Figure 8:
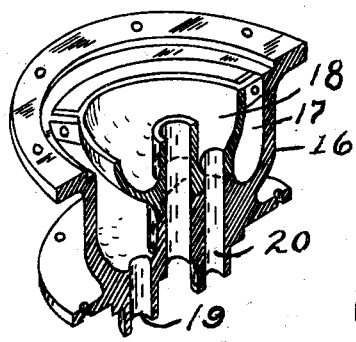
Figure 11:
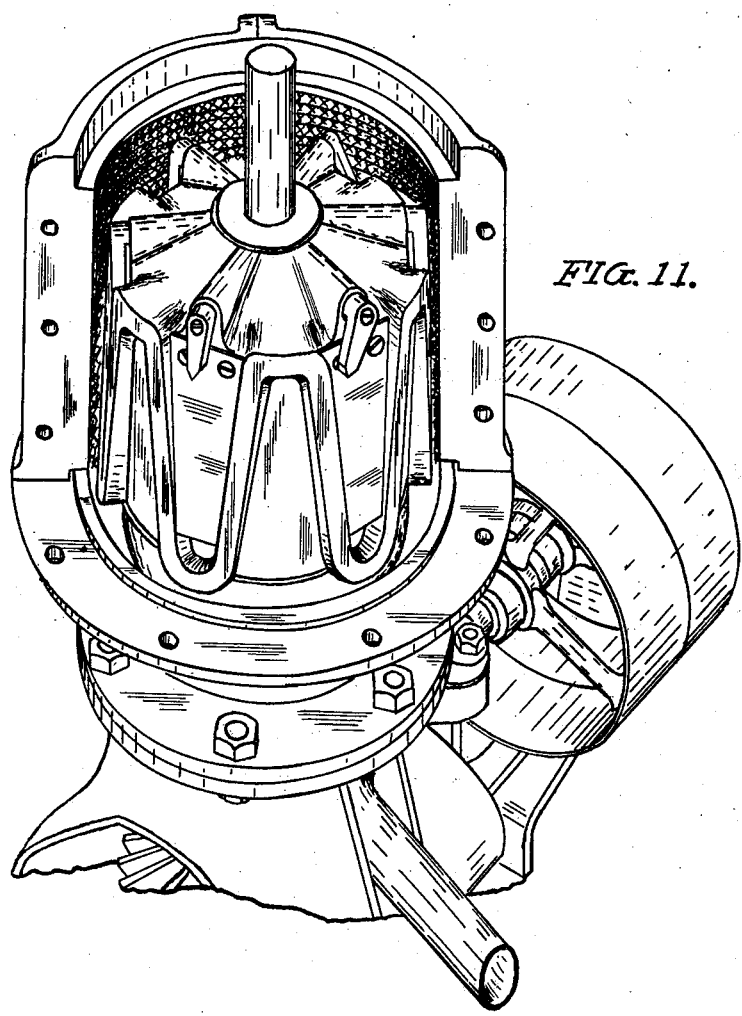

In the drawings which serve to illustrate the construction and operation of my invention: Figure 1 is a vertical section of a coffee pulper embodying my invention, Fig. 2, a partial section at right angles to Fig. 1, Fig. 3, a top plan view of the pulping-chamber and cylinder, Fig. 4, a side elevation of the pulping-cylinder, Fig. 5, a section on line 5—5 of Fig. 4, Fig. 6, a perspective view of the pulping-chamber with a side section removed to show the pulping-cylinder, Fig. 7, a perspective view, on an enlarged scale, of a section of the pulping-chamber, Fig. 8, a sectional perspective view of the discharge-hoppers, Figs. 9 and 10, enlarged sections of portions of the walls of pulping-chambers showing modified constructions of abrading surfaces, Fig. 11 a perspective view of the pulper, with parts removed and broken away, and Fig. 12, a perspective view of a peg having a conical head.

I prefer to construct the device substantially as follows: In a suitable standard 1 is mounted a horizontal shaft 2 provided with tight and loose pulleys 3 and 4 by means of which it may be driven in either direction, as desired. On one end shaft 2 carries a beveled gear 5 meshing with a beveled gear 6 splined to a vertical shaft 7. The lower end of shaft 7 is mounted in a suitable step-bearing 8 and is rendered adjustable vertically by means of set-screw 9 bearing against its lower end. A collar 10, secured in position by means of screws 11, serves to hold gear 6 in position.

On standard 1 is secured a suitable casing 12, inclosing gears 5 and 6 and provided with slotted openings 13, through which the discharge spouts 14 and 15 project. To the top of casing 12 is secured a hopper-casing 16 containing two substantially hemispherical co-axial discharge-hoppers 17 and 18, which communicate with discharge-pipes 15 and 14 through openings 19 and 20.

A pulping-chamber 21 is secured to the top of hopper-casing 16 and incloses the pulping-cylinder 22 which is fixed to shaft 7 and adapted to revolve in said chamber. The interior walls of chamber 21 are provided with abrading-surfaces which are preferably pyramidal projections 23 and the exterior walls of cylinder 22 with abrading surfaces which are preferably ribs 24 forming coffee channels 25 and pulp channels 26, open respectively at the top or feed-end and bottom or discharge-end. The pulping-cylinder 22 is hollow on the interior and is closed at the top or feed-end and open at the bottom or discharge-end, the open bottom being set over the hopper 18, so that material entering its hollow interior is free to pass into hopper 18 and thence through openings 20 to discharge-pipe 14.

Openings 27 lead from the lower ends of channels 25 to the interior of cylinder 22 and spring plates 28 are mounted in channels 25 so as to press outwardly toward the walls of chamber 21 and retard and regulate the passage of material from the upper portions of said channels to the openings 27 while the pulp is being removed from the beans by the coöperating action of the abrading surfaces of the chamber 21 and cylinder 22. The distance between the lower ends of spring plates 28 and the walls of chamber 21 is rendered adjustable by means of bolts 29 extending through slots in the walls of cylinder 22 and nuts 29$^a$ on said bolts. At the tops of channels 25 are mounted swinging gates 30 which, as cylinder 22 revolves, swing over against each side of channels 25 (depending upon the direction in which the cylinder is moving) to properly guide the unpulped coffee into channels 25. The coffee channels 25 are formed large at the top to provide sufficient space for the unpulped coffee and taper toward the bottom to give ample space for the coffee as the pulp is being removed while passing from top to bottom of said channels. The space 24$^a$ between chamber 21 and cylinder 22 and channels 26 is directly over hopper 17 so that material entering channels 26 and space 24$^a$ is free to pass into hopper 17 and thence, through opening 19 to discharge pipe 15. The channels 26 are undercut to provide projecting retaining walls 26$^a$ which are so formed that the pulp in said channels is held from being thrown out toward the abrading surface of chamber 21 and is retained by said retaining walls while it is passing through said channels thereby permitting the pulp to more readily discharge from said channels. Each channel 26 is also formed larger at the bottom than at the top for the same reason. The chamber 21 is slightly tapering in form, and the ribs 24 shaped to correspond so that by adjusting the shaft 7 longitudinally the space 24$^a$ for the passage of the pulp between the ribs of the cylinder and walls of the chamber may be varied as desired. To the top of chamber 21 is secured a spider 31 which carries a suitable bearing 32 for the upper end of shaft 7 and also serves as a support for feed-hopper 33. The feed-hopper 33 consists of an outer annular compartment 34, and an inner open compartment 35. The wall 34$^a$ separating the two compartments is lower than the outer wall 34$^b$ of compartment 34 so that water supplied to compartment 34 will flow over and fall onto the top of cylinder 22. A pipe 36 supplies water to compartment 34. The water serves to soften the pulp whereby it is more readily severed from the bean. It also aids in forcing the pulp through the machine and washes the pulp away from the beans.

Figure 10:
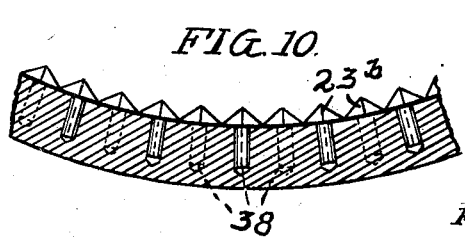
Figure 9:
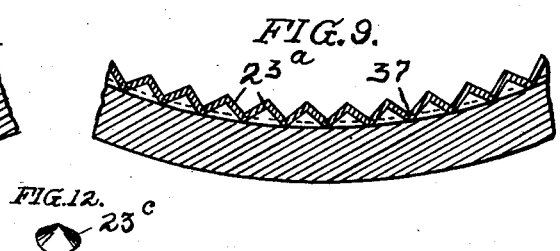
Figure 12:

In Figs. 9 and 10 I have illustrated modified constructions for securing the pyramidal projections to the inner walls of chamber 21. In Fig. 9 a metal lining 37 having pyramidal projections 23$^a$ extending therefrom is secured to the inner walls of the chamber, and in Fig. 10 the pyramidal projections consist of pegs 38 provided with pyramidal heads 23$^b$. If desired the pegs may be provided with conical heads 23$^c$ as shown in Fig. 12. These pegs are driven into the walls of chamber 21 and are preferably arranged in staggered form. The spaces or interstices between the pyramidal or conical projections provide means for the free passage of the pulped coffee through said interstices.

Figure 4:
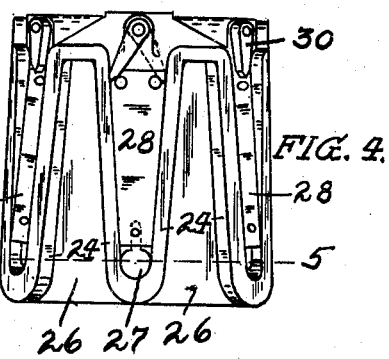
Figure 5:
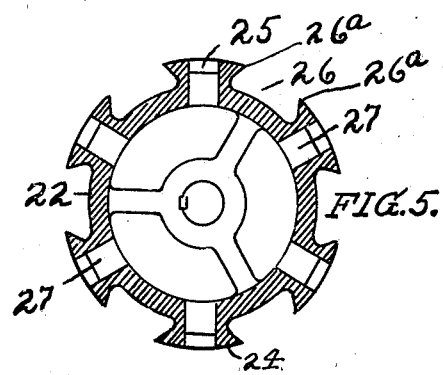

In operation the cylinder 22 is rotated by means of the pulleys on shaft 2 and water is constantly supplied to compartment 34. The unpulped coffee berries or "cherries" are placed in compartment 34 and overflow with the water onto the top of cylinder 22, as shown in Fig. 1, any heavy foreign substance settling to the bottom of compartment 34 whence it may be removed when desired. The cherries pass from the top of cylinder 22 into the open upper ends of coffee channels 25 where they are guided by the action of gates 30 (which swing over and close the rear sides of said channels, as indicated in Fig. 4) in their passage through channels 25 and are prevented by said gates from escaping upwardly from said channels. In channels 25 the cherries are subjected to the rasping effect of the projections on the walls of chamber 21. This removes the pulp from the coffee beans which pulp passes through the narrow space 24$^a$ between ribs 24 and the walls of chamber 21 into pulp channels 26, and thence into hopper 17, from which it discharges through pipe 15. The coffee beans, being too large to pass into channels 26 through space 24$^a$ remain in channels 25 and pass the ends of spring plates 28 which may be adjusted by nuts 29$^a$ whereby said spring plates are held out of contact with the abrading surface of chamber 21 and the spring plates so set as to admit of sufficient yielding for the free passage of any size of pulped beans. After passing the ends of the spring plates the beans pass through openings 27 into the interior of cylinder 22, and thence into hopper 18, from which they are discharged through pipe 14. Owing to the fact that chamber 21 and cylinder 22 are arranged in position to permit the coffee berries to be admitted between them throughout their abrading surfaces at the same time, the entire concave abrading surface of said chamber and convex abrading surface of said cylinder simultaneously coöperate upon the cherries to pulp them, and the cherries are subjected to the action of substantially the entire inner abrading surface of the chamber as they pass through channels 25, thus producing a very compact machine and giving it a large capacity.

It will be noted that the cylinder 22 may be revolved in either direction, the gates 30 being free to swing to either side and that the cylinder 22 may be readily adjusted to different sizes of beans, spring plates 28 adjusting themselves to the different sizes of beans.

While I have illustrated and described the preferred construction for carrying my invention into effect, it is capable of considerable modification without material departure from the scope or spirit thereof, as for instance, the machine may be arranged in other positions than vertical and the pulping-chamber may be made movable with relation to the pulping-cylinder, if desired. I do not, therefore, wish to be limited to the exact construction or arrangement shown in the drawings, but

What I claim as new and desire to secure by Letters Patent is:

1. In a coffee pulper, a vertically disposed imperforate pulping chamber having an abrading surface consisting of inwardly extending projections, and a vertically disposed pulping cylinder within said chamber having an abrading surface adapted to coöperate with the chamber upon the coffee beans to remove the pulp therefrom, and having suitable means for discharging the coffee beans and pulp into separate discharge hoppers.

2. In a coffee pulper, a pulping chamber having a concave abrading surface, a pulping cylinder having a convex abrading surface adapted to coöperate with said concave abrading surface, means for feeding the coffee berries between said abrading surfaces, whereby the entire abrading surfaces of said chamber and cylinder will simultaneously act upon the coffee to pulp it, means for simultaneously feeding water into said pulper with said berries to facilitate the pulping operation, and means for simultaneously discharging the coffee beans and pulp into separate discharge hoppers, substantially as and for the purposes set forth.

3. In a coffee pulper, the combination of a chamber 21 having pyramidal projections on its interior walls; a cylinder 22 having ribs 24 on its sides forming channels 25 and 26; said cylinder openings 27 leading from the bottoms of channels 25 to the interior of cylinder 22; substantially hemispherical coaxial hoppers 17 and 18 adapted to receive the discharge from the interior of cylinder 22 and from channels 26; discharge spouts for hoppers 17 and 18; spring plates 28 in channels 25; a swinging gate 30 in channels 25; suitable means for feeding coffee berries to the top of cylinder 22; and means for rotating the cylinder 22, substantially as set forth.

4. In a coffee pulper, a pulping chamber having a concave abrading surface, a pulping cylinder having a convex abrading surface adapted to coöperate with said concave abrading surface, means for feeding the coffee berries between said abrading surfaces, whereby the entire abrading surfaces of said chamber and cylinder will simultaneously act upon the coffee to pulp it, means for simultaneously feeding water into said pulper with said berries to facilitate the pulping operation, and means for directing the berries interiorly of the cylinder, and for discharging the coffee beans and pulp into separate discharge hoppers, substantially as and for the purposes set forth.

5. In a coffee pulper, a pulping-chamber having an abrading surface, a pulping-cylinder mounted within said chamber, ribs on the surface of the cylinder forming alternate coffee and pulp channels, and means to regulate the passage of the coffee and pulp through the coffee and pulp channels, respectively.

6. In a coffee pulper, a pulping-chamber having an abrading surface, a pulping-cylinder arranged and adapted to rotate within said chamber and to coöperate therewith, a series of ribs on the surface of the cylinder forming alternate coffee and pulp channels, means to feed the coffee and regulate its passage through the channels, means for removing the pulp from the coffee beans, and means for separating and discharging the coffee beans and pulp respectively.

7. In a coffee pulper, a pulping-chamber having an abrading surface, a pulping-cylinder rotatably mounted within said chamber and adapted to coöperate therewith, ribs on the surface of the cylinder forming coffee and pulp channels alternately open at the feed and discharge ends of the cylinder, spring plates in the coffee channels, said spring plates being adapted to retard the passage of the berries, and suitable means of discharge from the two sets of channels.

8. In a coffee pulper, a pulping chamber having an abrading surface, a pulping-cylinder rotatably mounted within said chamber and adapted to coöperate therewith, ribs on the surface of the cylinder forming alternate coffee and pulp channels and a swinging gate at the feed end of the coffee channels.

9. In a coffee pulper, a pulping-chamber having an abrading surface, a pulping-cylinder rotatably mounted within said chamber, ribs on the surface of the cylinder forming coffee and pulp channels alternately open at the feed and discharge ends of the cylinder, spring plates in the coffee channels, said spring plates being adapted to retard the passage of the coffee, swinging gates at the feed ends of the spring plate provided channels, and suitable means of discharge from the two sets of channels.

10. In a coffee pulper, a pulping-chamber having an abrading surface, a pulping-cylinder mounted within said chamber, ribs on the surface of the cylinder forming alternate coffee and pulp channels, said pulp channels having projecting retaining walls adapted to retain the pulp substantially as set forth.

11. In a coffee pulper, a pulping-chamber having an abrading surface, a pulping-cylinder mounted within said chamber, ribs on the surface of the cylinder forming tapering coffee and pulp channels, said coffee and pulp channels being arranged alternately, said coffee channels being largest at their feed ends, and said pulp channels being largest at their discharge-ends.

12. In a coffee pulper, a pulping-chamber having an abrading surface, a pulping-cylinder rotatably mounted within said chamber and adapted to coöperate therewith, ribs on the surface of the cylinder forming alternate coffee and pulp channels and forming between said ribs and the surface of the chamber pulp discharging spaces leading from the coffee channels to the pulp channels, and suitable means of discharge.

13. In a coffee pulper, a pulping-chamber having an abrading surface, a pulping-cylinder rotatably mounted within said chamber, ribs on the surface of the cylinder forming alternate coffee and pulp channels and forming between said ribs and the surface of the chamber pulp discharging spaces leading from the coffee channels to the pulp channels, said pulping cylinder being provided with an opening leading from each coffee channel into the interior of the cylinder, and suitable means for the discharge of the beans and pulp.

14. In a coffee pulper, a pulping-chamber having an abrading surface, a pulping-cylinder rotatably mounted within said chamber and adapted to coöperate therewith, ribs on the surface of the cylinder forming alternate coffee and pulp channels, spring plates in the coffee channels adapted to retard the passage of the beans, and means to regulate the free end of each spring plate to adjust the size of the space between the lower end of said spring plate and the abrading surface of the chamber.

15. In a coffee pulper, a pulping-chamber having an abrading surface, a pulping-cylinder rotatably mounted within said chamber and adapted to coöperate therewith, ribs on the surface of the cylinder forming alternate coffee and pulp channels and forming between said ribs and the surface of the chamber pulp discharging spaces leading from the coffee channels to the pulp channels, and discharge-hoppers for the coffee beans and pulp respectively.

16. In a coffee pulper, a pulping-chamber having an abrading surface comprising pyramidal projections, a pulping-cylinder having an abrading surface comprising longitudinal ribs and adapted to coöperate but not intermesh with the abrading surface thereof, means to feed the coffee and regulate its passage between said abrading surfaces, and means for separating the pulp from the coffee beans and for separately discharging said pulp and beans respectively.

17. In a coffee pulper, a pulping-chamber tapered longitudinally and having an abrading surface, a pulping-cylinder tapered longitudinally and having an abrading surface comprising longitudinal ribs adapted to coöperate with the abrading surface of the chamber, means for adjusting said cylinder longitudinally within said chamber, means for feeding the coffee berries between said abrading surfaces, means for removing the pulp from the beans, and means for separately discharging said pulp and coffee beans.

18. In a coffee pulper, a pulping-chamber having an abrading surface comprising pyramidal projections arranged in staggered form, a pulping-cylinder having an abrading surface comprising longitudinal ribs and adapted to coöperate but not intermesh with the abrading surface of said chamber, means for separating the pulp from the coffee beans and means for separately discharging said pulp and beans respectively.

19. In a coffee pulper, a pulping-chamber having an abrading surface, a pulping-cylinder rotatably mounted within said chamber and adapted to coöperate therewith, ribs on the surface of the cylinder forming alternate coffee and pulp channels and forming between said ribs and the abrading surface of the chamber pulp discharging spaces leading from the coffee channels to the pulp channels, a pulp discharging hopper adapted to receive the pulp from the pulp channels and having discharge openings and pipes leading therefrom, said pulping cylinder being provided with an opening leading from each coffee channel to the interior of the cylinder and a coffee bean discharging hopper adapted to receive the coffee beans and having discharge openings and pipes leading therefrom.

RICHARD BAHMANN.

Witnesses:
ROBT. F. BAHMANN,
JAMES N. RAMSEY.

Copies of this patent may be obtained for five cents each, by addressing the "Commissioner of Patents, Washington, D. C."